United States Patent
Gomez et al.

(10) Patent No.: US 11,501,490 B2
(45) Date of Patent: Nov. 15, 2022

(54) SYSTEMS AND METHODS FOR MULTI-RESOLUTION FUSION OF PSEUDO-LIDAR FEATURES

(71) Applicant: Toyota Research Institute, Inc., Los Altos, CA (US)

(72) Inventors: Victor Vaquero Gomez, Colmenar Viejo (ES); Rares A. Ambrus, San Francisco, CA (US); Vitor Guizilini, Santa Clara, CA (US); Adrien D. Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 16/940,701

(22) Filed: Jul. 28, 2020

(65) Prior Publication Data
US 2022/0036650 A1  Feb. 3, 2022

(51) Int. Cl.
*G06T 17/05*  (2011.01)
*G06V 20/56*  (2022.01)

(52) U.S. Cl.
CPC .............. *G06T 17/05* (2013.01); *G06V 20/56* (2022.01)

(58) Field of Classification Search
None
See application file for complete search history.

(56) References Cited

U.S. PATENT DOCUMENTS

| 9,760,806 | B1 | 9/2017 | Ning et al. |
| 11,100,669 | B1* | 8/2021 | Zhou ................. G06V 20/64 |
| 2021/0342609 | A1* | 11/2021 | Smolyanskiy ......... G06K 9/627 |

FOREIGN PATENT DOCUMENTS

| CN | 107194431 A | 9/2017 |
| CN | 110543858 A | 12/2019 |

OTHER PUBLICATIONS

Zhang, Wei, Gregory Zelinsky, and Dimitris Samaras. "Real-time accurate object detection using multiple resolutions." 2007 IEEE 11th International Conference on Computer Vision. IEEE, 2007.*
Ng MH, Radia K, Chen J, Wang D, Gog I, Gonzalez JE. BEV-Seg: Bird's Eye View Semantic Segmentation Using Geometry and Semantic Point Cloud. arXiv preprint arXiv:2006.11436. Jun. 19, 2020.*
Srivastava, Siddharth, Frederic Jurie, and Gaurav Sharma. "Learning 2d to 3d lifting for object detection in 3d for autonomous vehicles." 2019 IEEE/RSJ International Conference on Intelligent Robots and Systems (IROS). IEEE, 2019.*

(Continued)

*Primary Examiner* — Edward Martello
(74) *Attorney, Agent, or Firm* — Dinsmore & Shohl LLP (57) ABSTRACT

The embodiments disclosed herein describe vehicles, systems and methods for multi-resolution fusion of pseudo-LiDAR features. In one aspect, a method for multi-resolution fusion of pseudo-LiDAR features includes receiving image data from one or more image sensors, generating a point cloud from the image data, generating, from the point cloud, a first bird's eye view map having a first resolution, generating, from the point cloud, a second bird's eye view map having a second resolution, and generating a combined bird's eye view map by combining features of the first bird's eye view map with features from the second bird's eye view map.

20 Claims, 6 Drawing Sheets

(56) References Cited

OTHER PUBLICATIONS

Kong et al.; "HyperNet: Towards Accurate Region Proposal Generation and Joint Object Detection;" 2016 IEEE Conference on Computer Vision and Pattern Recognition (CVPR) Year: 2016 | Conference Paper | Publisher: IEEE (Year: 2016).*

Zhou et el.; "VoxelNet: End-to-End Learning for Point Cloud Based 3D Object Detection;" 2018 IEEE/CVF Conference on Computer Vision and Pattern Recognition; IEEE Computer Society; pp. 4490-4499 (Year: 2018).*

Beltran et al.; "BirdNet: a 3D Object Detection Framework from LiDAR Information;" 2018 21st International Conference on Intelligent Transportation Systems (ITSC) Maui, Hawaii, USA, Nov. 4-7, 2018 (Year: 2018).*

Zhongyang et al.; "Classification of LiDAR Point Cloud based on Multiscale Features and PointNet;" In 2018 Eighth International Conference on Image Processing Theory, Tools and Applications (IPTA), pp. 1-7. IEEE, 2018 (Year: 2018).*

Seferbekov et al.; "Feature Pyramid Network for Multi-Class Land Segmentation;" In Proceedings of the IEEE Conference on Computer Vision and Pattern Recognition Workshops (pp. 272-275). (Year: 2018).*

Simonyan et al.; "Very Deep Convolutional Networks for Large-Scale Image Recognition;" arXiv:1409.1556v6 [cs.CV] for this version) (Year: 2015).*

Monocular 3D Object Detection with Pseudo-LiDAR Point Cloud https://arxiv.org/pdf/1903.09847.pdf, Aug. 31, 2019.

Pseudo-LiDAR from visual depth estimation: bridging the gap in 3D object detection for autonomous driving https://arxiv.org/pdf/1812.07179.pdf, Jun. 14, 2019.

Monocular 3D Object Detection in Autonomous Driving—A Review https://towardsdatascience.com/monocular-3d-object-detection-in-autonomous-driving-2476a3c7f57e, Jan. 14, 2020.

Deep multi-modal object detection and semantic segmentation for autonomous driving: datasets, methods, and challenges, https://arxiv.org/pdf/1902.07830.pdf, Feb. 8, 2020.

\* cited by examiner

SYSTEMS AND METHODS FOR MULTI-RESOLUTION FUSION OF PSEUDO-LIDAR FEATURES

TECHNICAL FIELD

The present specification relates to object detection and, more particularly, system, methods and vehicles for object detection using pseudo-LiDAR.

BACKGROUND

Light detection and ranging (LiDAR) is frequently used in autonomous vehicle applications to detect objects within the environment of the autonomous vehicle. A LiDAR sensor emits a plurality of beams into the environment and receives a plurality of reflected beams that are reflected by objects in the environment. The time of return of the reflected beams enable the depth of objects in the environment to be detected. The result of the reflected beams is a point cloud representing the objects.

This point cloud may be used by an object detection algorithm, such as a classifier neural network, to detect the types of objects found in the point cloud data. In some cases, the point cloud, which is three dimensional, is converted to a "bird's eye view map" by projecting the three dimensional data onto a two dimensional plane. This bird's eye view map is then inputted into the object detection algorithm to detect objects in the environment.

Although LiDAR works well in automotive applications, the sensors themselves are costly, and cost much more than camera sensors. Further, current LiDAR sensors are limited by the number of beams they can produce, which results in sparse point cloud data.

Accordingly, alternative object detection sensors having more dense point cloud data for less cost are desired.

SUMMARY

In one aspect, a method for multi-resolution fusion of pseudo-LiDAR features includes receiving image data from one or more image sensors, generating a point cloud from the image data, generating, from the point cloud, a first bird's eye view map having a first resolution, generating, from the point cloud, a second bird's eye view map having a second, and generating a combined bird's eye view map by combining features of the first bird's eye view map with features from the second bird's eye view map.

In another aspect, a method of detecting an object includes generating a bird's eye view of pseudo-LiDAR data by: receiving image data from one or more image sensors, generating a point cloud from the image data, generating, from the point cloud, a first bird's eye view map having a first resolution, generating, from the point cloud, a second bird's eye view map having a second resolution, and generating a combined bird's eye view map by combining features of the first bird's eye view map with features from the second bird's eye view map. The method further includes detecting, using an object detection algorithm, one or more objects from the combined bird's eye view map.

In yet another aspect, a vehicle includes one or more image sensors that produce image data, one or more processors, and one or memory modules comprising a non-transitory computer readable memory storing computer readable instructions. When executed by the one or more processors, the computer readable instructions cause the one or more processors to: receive the image data from the one or more image sensors, generate a point cloud from the image data, generate, from the point cloud, a first bird's eye view map having a first resolution, generate, from the point cloud, a second bird's eye view map having a second resolution, generate a combined bird's eye view map by combining features of the first bird's eye view map with features from the second bird's eye view map, and detect, using an object detection algorithm, one or more objects from the combined bird's eye view map.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe vehicles, systems and methods for object detection using pseudo-LiDAR data. LiDAR sensors are expensive sensors that produce sparse points in returned point cloud data. However, image sensors, such as cameras, produce dense points in the images that they produce, and are much less costly and complicated than LiDAR sensors.

3D Point cloud data similar to LiDAR point cloud data can be extracted from an intermediate depth estimation taken from image data. Such point cloud data is referred to as "pseudo-LiDAR" in that it resembles LiDAR point cloud data. Pseudo-LiDAR data may be inputted into an object detection algorithm to detect objects within the environment as represented by the pseudo-LiDAR. However, pseudo-LiDAR produces less accurate object detection results than traditional LiDAR data. For example, aberrations and distortions may be created when the image data is transformed into pseudo-LiDAR and a bird's eye view map, as described in more detail below.

There are many hyperparameters that are set by the user when performing object detection using LiDAR data. One such hyperparameter is the grid resolution of the bird's eye view map when the three dimensional LiDAR data is projected onto a two dimensional plane. The resolution is established by the length and width of each cell which enclose a volume of the 3D space in the bird's eye view. However, one resolution size may be effective for detecting one type of object (e.g., a pedestrian) but not effective for other types of objects (e.g., vehicles). Embodiments of the present disclosure improve the performance of pseudo-LiDAR by combining multiple bird's eye view maps having multiple different resolutions. Thus, the best features for detecting different types of objects are extracted and utilized.

Various embodiments of vehicles, systems and methods for generating a bird's eye view map and for detecting an object are described in detail below.

Figure 1:
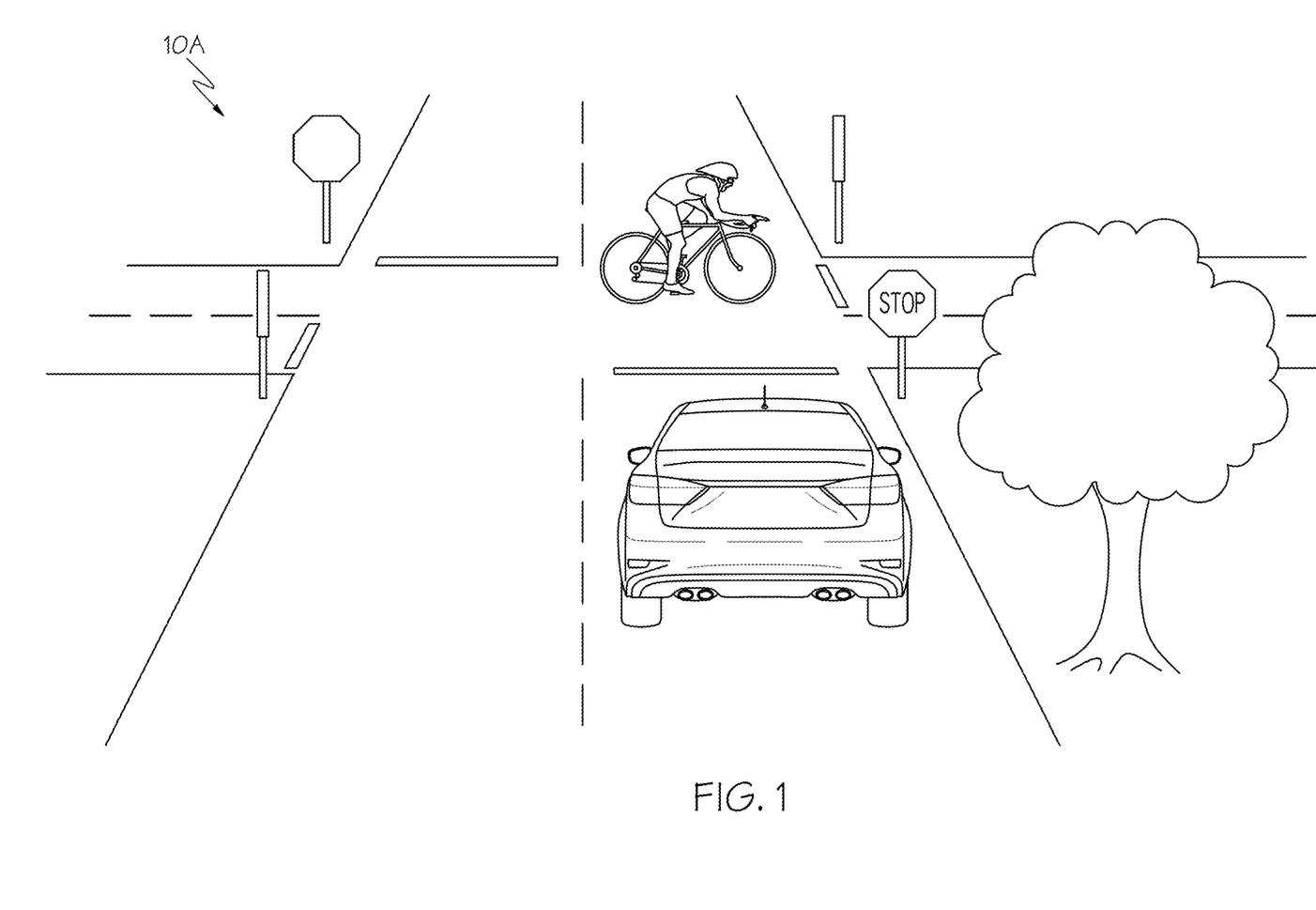
FIG. 1 schematically depicts example image data from a scene according to one or more embodiments described and illustrated herein.

Referring now to FIG. 1, example image data 10A generated from an image sensor is depicted. As a non-limiting example, the image sensor may be provided on a vehicle, such as an autonomous vehicle. The image sensor may be any known or yet-to-be-developed image sensor. As a non-limiting example, the image sensor may be a RGB image sensor. In some embodiments, the image sensor may be configured to measure depth, such as an RGB-D image sensor. In the illustrated example, objects that are present in the scene as imaged by the image sensors include a bicyclist, an automobile, a tree, and several stop signs. Each of these objects are at a particular depth with respect to the image sensor.

Figure 2:
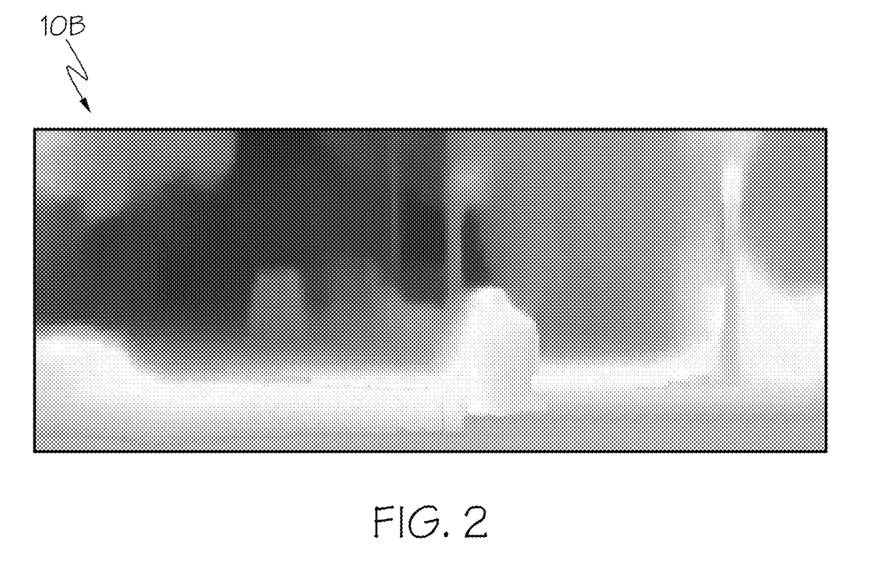
FIG. 2 graphically depicts example depth data from a scene according to one or more embodiments described and illustrated herein.

Referring now to FIG. 2, the depth data 10B of objects in the image data is determined, either by direct measurement (e.g., using an RGB-D image sensor), or by estimation, such as, without limitation, by monocular depth regression. From the image data 10A and the depth data 10B, a pseudo-LiDAR three dimensional point cloud 12 is generated. The pseudo-LiDAR point cloud 12 resembles a traditional LiDAR point cloud, but is much denser because it is not limited by the number of projected laser beam points of a traditional LiDAR sensor. Any known-or-yet-to-be-developed method of generating the pseudo-LiDAR point cloud 12 from the image data 10A and the depth data 10B may be utilized. Non-limiting methods of generating depth from monocular images are described in U.S. patent application Ser. No. 16/277,303 filed on Feb. 15, 2019 and entitled "Systems and Methods for Depth Estimation Using Monocular Images," which is hereby incorporated by reference in its entirety.

Figure 4:
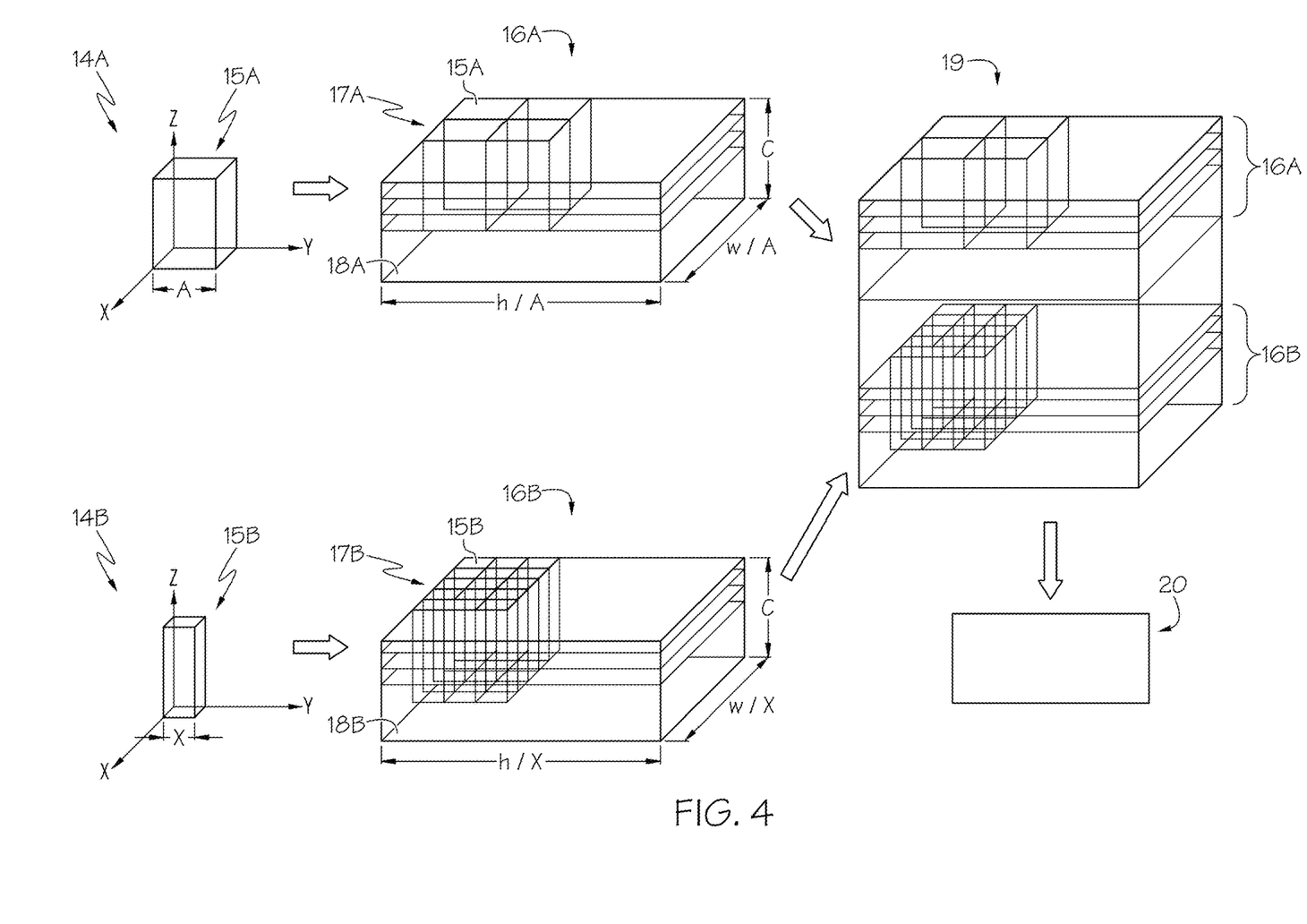
FIG. 4 schematically depicts an example process for combining multiple bird's eye view maps having different resolutions into a combined bird's eye view map according to one or more embodiments described and illustrated herein.

From the pseudo-LiDAR point cloud 12, two or more bird's eye view maps having different resolutions are generated, as shown in FIG. 4. A first bird's eye view map 16A has a grid size having a first resolution of A as determined by both height h and width w of the volume space to be applied. The first bird's eye view map 16A is generated by projecting the pseudo-LiDAR point cloud 12 onto a two dimensional plane. The grid cell defined by the resolution is used to group three dimensional points lying in inside the defined subspace, from which features are extracted to provide a useful representation that represent each "pixel" in a layer of the resulting bird's eye view map. The volume of the 3D Euclidean space of pseudo-LiDAR points that are subdivided according to the resolution that is chosen is referred to herein as voxels or pillars. Any known or yet-to-be-developed method of generating the bird's eye view map may be utilized. Non-limiting examples include PointPillars and VoxelNet.

The first bird's eye view map 16A includes a plurality of individual bird's eye view map layers 18A according to each of the features in which the group of 3D points is represented. Each bird's eye view map layer 18A extracts a certain feature and thus each bird's eye view map layer 18A is an individual feature map. Each of the feature vectors therefore encodes the 3D points of certain position on the space, representing a "pixel" of the bird's eye view feature space. Each feature inside the vector contributes as a single value "pixel" on each layer of the Bird's Eye View feature space. Thus, the bird's eye view map (e.g., the first bird's eye view map 16A) has an array of cells defined by the height h and width w (i.e., the grid resolution) of the volume space applied and the number of features c and thus layers (e.g., layer 18A) that are extracted.

Figure 3:
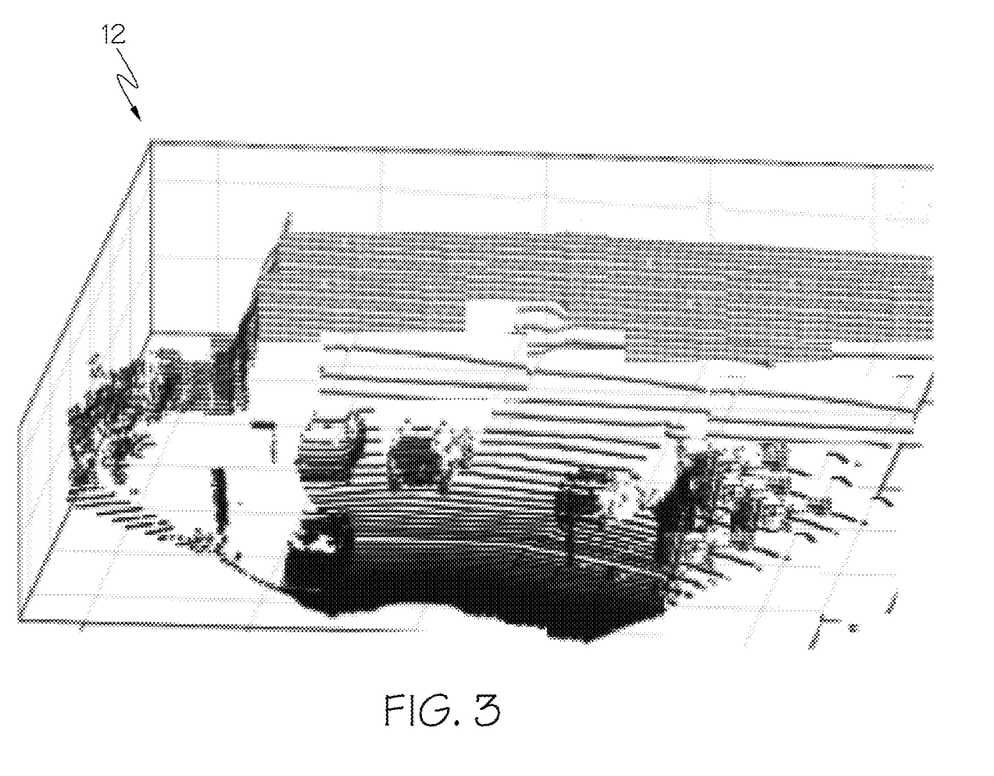
FIG. 3 graphically depicts example pseudo-LiDAR point cloud data according to one or more embodiments described and illustrated herein.

As a non-limiting example, PointNet may be used to extract a vector of features of size C (e.g., as shown in FIG. 3). The group of points enclosed in the volumetric grid cell of the 3D space are processed to extract these features.

These first bird's eye view map layers 18A corresponding to the number of features c all have the same first resolution A. The first bird's eye view map layers 18A are stacked on one another such that their individual pixels are aligned with one another to define the array of cells 15A. Thus, an array 17A of first cells 15A define the first bird's eye view map 16A.

Similarly, a second bird's eye view map 16B is generated from the pseudo-LiDAR point cloud 12. The second bird's eye view map 16B has a grid size having a second resolution X as determined by both height h and width w of the volume space to be applied, which is smaller than the first resolution A of the first bird's eye view map 16A. However, it should be understood that the second resolution X could be larger than the first resolution A. The second bird's eye view map 16B has c number of bird's eye view map layers 18B defining an array 17B of second cells 15B having a second volume $v_2$. As stated above, each layer bird's eye view map layer 18B has a plurality of pixels defined by a feature vector.

Any number of additional bird's eye view maps having additional resolutions may be generated depending on the end application.

The first bird's eye view map 16A, the second bird's eye view map 16B, and any additional bird's eye view maps are combined to generate a combined bird's eye view map 19 that is provided to an object detection algorithm 20 (and/or some other downstream task).

The first bird's eye view map 16A may be combined with the second bird's eye view map 16B (and any additional bird's eye view maps) by any method. In one example, the combined bird's eye view map 19 is a concatenation (i.e., stacking) of each of the first bird's eye view map 16A, the second bird's eye view map 16B, and any additional bird's eye view maps as shown in FIG. 4. This concatenated combined bird's eye view map 19 is then passed to the object detection algorithm, which has many more and richer features to use to classify objects than from a bird's eye view map having only one resolution. In this example, the features of the concatenated combined bird's eye view map 19 are combined without mathematical manipulation. Thus, all feature vectors from each bird's eye view map are passed to the object detection algorithm.

In another example, the features of the first cells 15A of the first bird's eye view map 16A are added with the features of the second cells 15B of the second bird's eye view map 16B. Still referring to the combined bird's eye view map 19 of FIG. 4, features of first cells 15A and second cells 15B that are aligned with one another in the Z-direction may be added together and therefore combined. For example, four second cells 15B fit within one first cell 15A. The vectors of the four second cells 15B may be mathematically added to the vector of the first cell 15A. The result is a combined bird's eye view map having c number of layers, where cells aligned within one another in the Z-direction are combined by an addition function.

It is noted that the features of the multiple bird's eye view maps may be added or otherwise combined by a linear function or a non-linear function. As another non-limiting example, a neural network may be utilized to learn the best combination of features for a particular application such that the resulting combined bird's eye view map includes some features from each individual bird's eye view map and/or combinations of features from the individual bird's eye view maps. The neural network may be any network that learns end-to-end with a detector the best combination of features for the final task (e.g., object detection).

However the individual bird's eye view maps are combined, the resulting combined bird's eye view map has a richer feature set than a bird's eye view map having only one resolution. As an example, a bird's eye view map with a fine resolution (e.g., 10 cm×10 cm) will provide a smaller voxel or pillar size (and more total voxels or pillars) wherein the 3D Euclidean space of pseudo-LiDAR points are subdivided may perform well in detecting pedestrians by an object detection algorithm but perform poorly in detecting vehicles such as cars and trucks. Similarly, a bird's eye view map with a coarse resolution (e.g., 1 m×1 m, which will provide a larger voxel or pillar size with fewer total voxels or pillars) may perform well in detecting vehicles by an object detection algorithm but perform poorly in detecting pedestrians. By providing bird's eye view maps with different resolutions, the best features for detecting different types of objects may be provided to the object recognition algorithm. Further, the multiple resolutions may also address distortions that often occur when creating pseudo-LiDAR data.

It is noted that the resulting bird's eye view map corresponding to the fine resolution will be larger (i.e., have more voxels or pillars) than the bird's eye view map corresponding to the coarse resolution.

Figure 5:
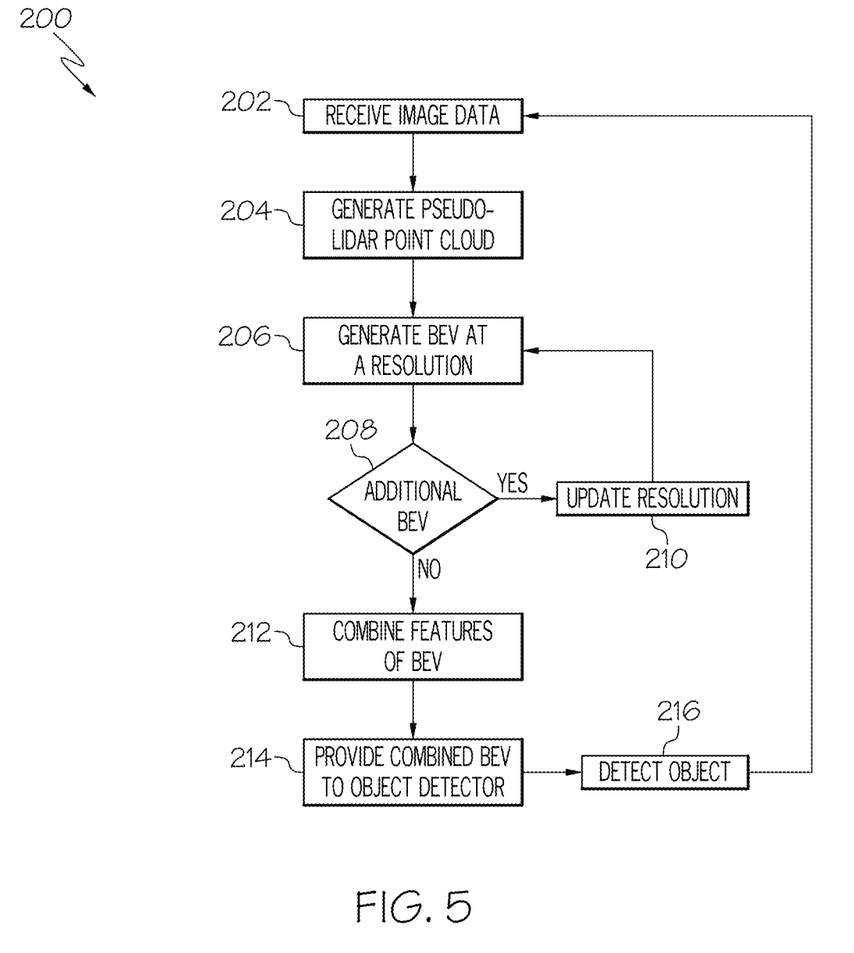
FIG. 5 graphically depicts an example process for detecting objects using image data and pseudo-LiDAR point cloud data according to one or more embodiments described and illustrated herein.

Referring now to FIG. 5, an example method 200 for detecting an object using pseudo-LiDAR is illustrated. At block 202, image data is received by one or more processors from one or more image sensors. As a non-limiting example, the one or more processors may be one or more processors of an electronic control unit of a vehicle, and the one or more image sensors may be RGB or RGB-D image sensors. It should be understood that embodiments of the present disclosure may be applied in applications other than vehicular applications, such as robotic applications, surveillance applications, visually-impaired assistance applications, and any other application wherein object detection is utilized. In embodiments where the depth is not measured, such as by an RGB-D image sensor, the per-pixel depth of the objects represented by the image data should be estimated, such as, without limitation, by monocular depth regression.

At block 204, pseudo-LiDAR point cloud data is generated using the image data received at block 202 as input. Any known or yet-to-be-developed method of generating the pseudo-LiDAR point cloud data may be utilized.

The pseudo-LiDAR point cloud data is used to generate a bird's eye view map at a resolution and having one or more bird's eye view map layers at block 206. Any known or yet-to-be-developed method for generating the bird's eye view map may be used. Non-limiting examples of methods to generate the bird's eye view map include PointPillars and VoxelNet. The bird's eye view map may have any number of layers, and may extract any number and type of features.

The method then moves to block 208, where it is determined if any more bird's eye view maps are desired. If so, the resolution is updated at block 210 to a resolution that is different from any previous resolution used to generate previous bird's eye view maps. The updated resolution is used at block 206 to generate another bird's eye view map at the updated resolution. The process repeats until there are no more desired bird's eye view maps.

After all bird's eye view maps are created, the features of all of the bird's eye view maps are combined at block 212 to generate a combined bird's eye view map. The features of the multiple bird's eye view maps may be combined in any number of ways. In one example, the features are concatenated (i.e., stacked) without mathematically combining the features. In another embodiment, features of aligned cells are mathematically added to one another. In yet other embodiments the features are non-linearly combined, such as by a neural network.

At block 214, the combined bird's eye view map is provided to an object detection algorithm. Any known or yet-to-be-developed object detection algorithm may be utilized to detect objects represented by the combined bird's-eye-view map. Example non-limiting object detection algorithms include retinaNet and a fully convolutional one-stage object detector (FCOS).

The output of the object detection algorithm is one or more detected objects at block 216, which may be used by one or more processes, such as autonomous driving, robot navigation, and the like. The method may repeat itself continuously as more image data is received at block 202.

Figure 6:
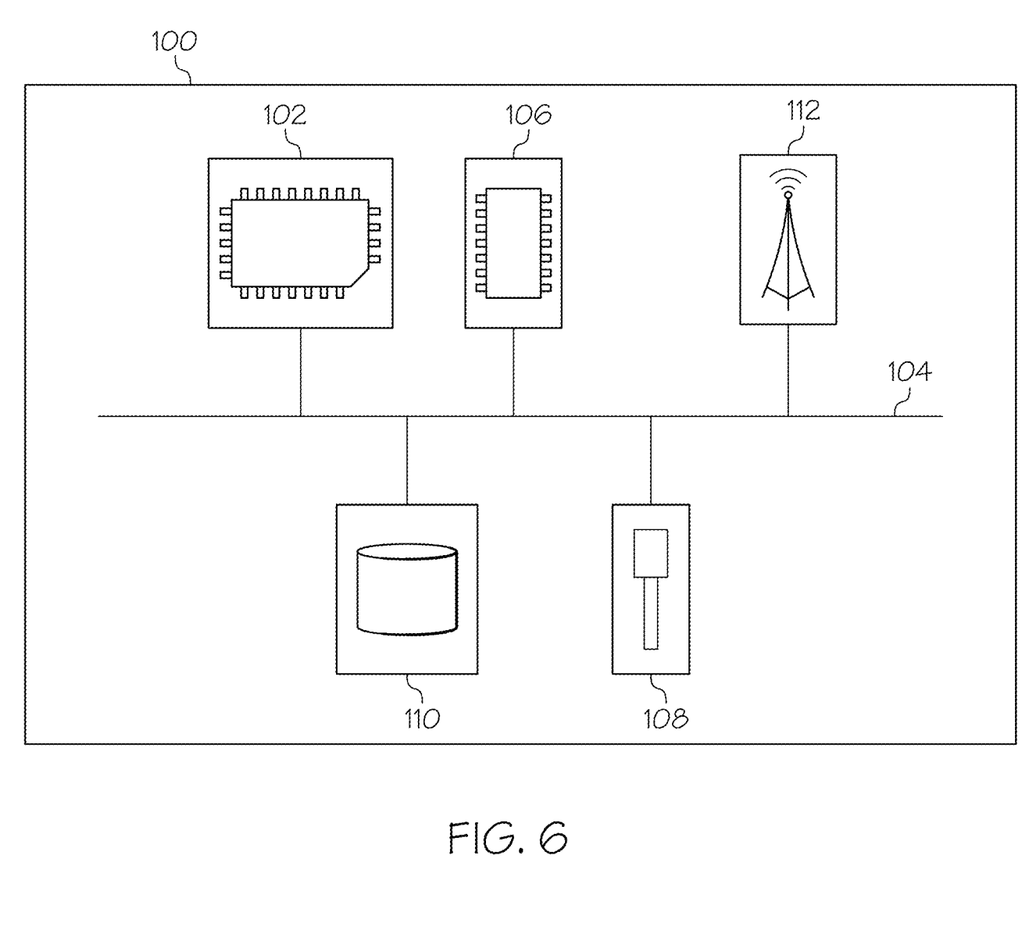
FIG. 6 schematically depicts an example system for detecting objects using image data and pseudo-LiDAR point cloud data according to one or more embodiments described and illustrated herein.
Figure 7:
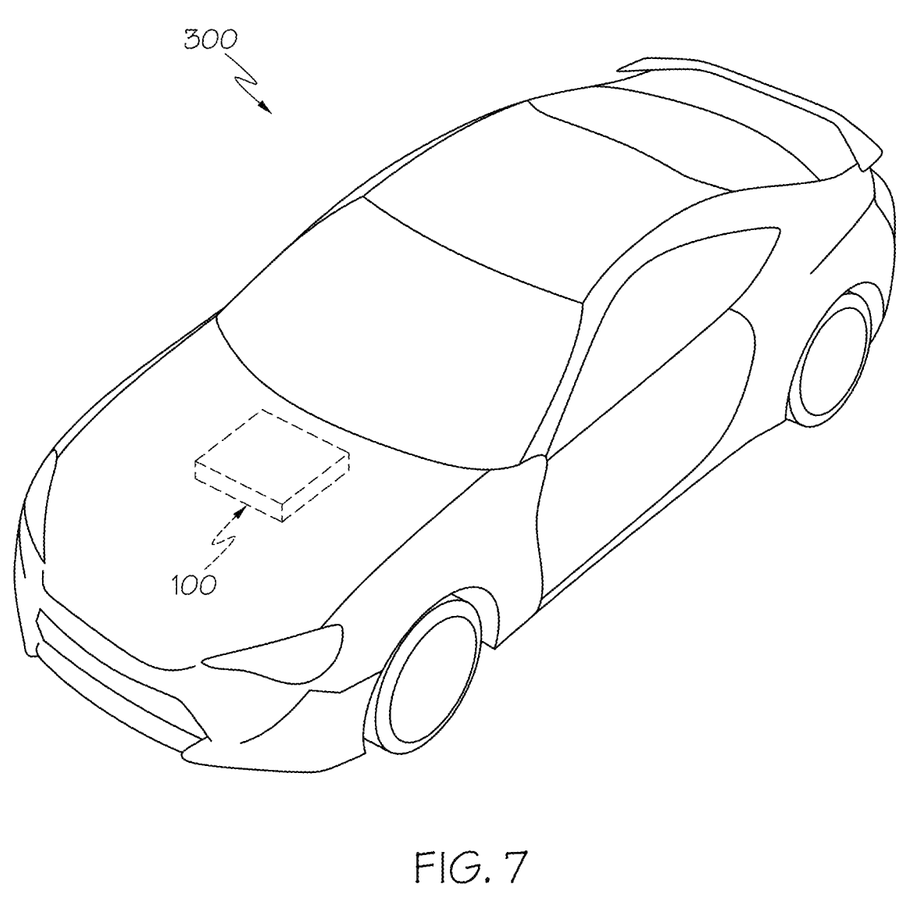
FIG. 7 schematically depicts an example vehicle including a system for detecting objects using image data and pseudo-LiDAR point cloud data according to one or more embodiments described and illustrated herein.

FIG. 6 depicts an example system 100 for performing the functionalities as described herein. In some embodiments, the system 100 may be a vehicle system included in a vehicle, such as the vehicle 300 illustrated in FIG. 7. The system 100 includes one or more processors 102, a communication path 104, one or more memory modules 106, a satellite antenna 108, one or more vehicle sensors 110, and network interface hardware 112, the details of which will be set forth in the following paragraphs. The system 100 may also include one or more modules for performing autonomous driving of the vehicle 300. These modules are not shown in FIG. 6 for brevity. It should be understood that the system 100 of FIG. 6 is provided for illustrative purposes only, and that other systems 100 comprising more, fewer, or different components may be utilized.

Each of the one or more processors 102 may be any device capable of executing machine readable and executable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the system 100. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth®, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The system 100 includes one or more memory modules 106 coupled to the communication path 104. The one or more memory modules 106 may comprise RAM, ROM, flash memories, hard drives, or any device capable of storing machine readable and executable instructions such that the machine readable and executable instructions can be accessed by the one or more processors 102. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 106. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 106 include logic in the form of computer readable instructions that perform the functionalities described herein, such as generating pseudo-LiDAR point cloud data, generating a plurality of bird's eye view maps from the pseudo-LiDAR point cloud data, combining the features of the plurality of bird's eye view maps, and detecting objects from the combined bird's eye view map. Data used to support these functionalities may be stored in the one or more memory modules 106 and/or in remote memory modules.

Referring still to FIG. 6, the example system 100 may comprise a satellite antenna 108 that is coupled to the communication path 104 such that the communication path 104 communicatively couples the satellite antenna 108 to other modules of the system 100. The satellite antenna 108 is configured to receive signals from global positioning system satellites. Specifically, in one embodiment, the satellite antenna 108 includes one or more conductive elements that interact with electromagnetic signals transmitted by global positioning system satellites. The received signal is transformed into a data signal indicative of the location (e.g., latitude and longitude) of the satellite antenna 108 or an object positioned near the satellite antenna 108, by the one or more processors 102. Thus, the satellite antenna 108 allows the vehicle 300 to monitor its location.

The system 100 comprises one or more sensors 110. Each of the one or more sensors 110 is coupled to the communication path 104 and communicatively coupled to the one or more processors 102. The one or more sensors 110 may include, but are not limited to, LiDAR sensors, RADAR sensors, optical sensors (e.g., image sensors, laser sensors, proximity sensors, location sensors), and the like. The sensors 110 may be used to produce data to perform the functionalities described herein, as well as other functionalities, such as to navigate the vehicle 300. As described above, the functionalities described herein use sensors that are configured as image sensors that produce image data, such as RGB image sensors and/or RGB-D image sensors.

Still referring to FIG. 6, the system 100 may comprise network interface hardware 112 for communicatively coupling the system 100 to a remote computing device (not shown). The network interface hardware 112 can be communicatively coupled to the communication path 104 and can be any device capable of transmitting and/or receiving data via a network. Accordingly, the network interface hardware 112 can include a communication transceiver for sending and/or receiving any wired or wireless communication. For example, the network interface hardware 112 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 112 includes hardware configured to operate in accordance with the Bluetooth® wireless communication protocol. The network interface hardware 112 of the system 100 may transmit information about pedestrians detected by the vehicle sensors 110 to the remote computing device 104. In some examples, the network interface hardware 112 may transmit one or more images captured by the sensors 110 to the remote computing device 104.

It should now be understood that embodiments of the present disclosure are directed to methods of generating bird's eye view maps from pseudo-LiDAR point cloud data that combines multiple bird's eye view maps having different resolutions into a combined bird's eye view map. The rich feature set resulting from the combined bird's eye view map overcomes deficiencies of using pseudo-LiDAR for downstream processing tasks, such as object detection. The different resolutions enable different types of objects to be optimally detected by an object detection recognition algorithm, for example.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method for multi-resolution fusion of pseudo-LiDAR features, the method comprising:
   receiving image data from one or more image sensors;
   generating a point cloud from the image data, wherein the point cloud comprises pseudo-LiDAR data;
   generating, from the point cloud, a first bird's eye view map having a first resolution;
   generating, from the point cloud, a second bird's eye view map having a second resolution; and
   generating a combined bird's eye view map by combining features of the first bird's eye view map with features from the second bird's eye view map.

2. The method of claim 1, further comprising generating, from the point cloud, one or more additional bird's eye view maps having one or more additional resolutions, wherein generating the combined bird's eye view map further comprises combining features of the one or more additional bird's eye view maps with the features of the first bird's eye view map and the second bird's eye view map.

3. The method of claim 1, wherein:
   generating the first bird's eye view map comprises:
      subdividing the pseudo-LiDAR data into a plurality of voxels having a first volume that is determined by the first resolution; and
      generating an array of first cells comprising one or more layers by extracting one or more features from the pseudo-LiDAR data within the plurality of voxels, wherein each layer of the one or more layers comprises a plurality of pixels, each pixel comprises an individual feature extracted from an individual voxel, and a number of layers equals a number of features extracted from the pseudo-LiDAR data;
   generating the second bird's eye view map comprises:
      subdividing the pseudo-LiDAR data into a plurality of voxels having a second volume that is determined by the first resolution; and
      generating an array of second cells comprising one or more layers by extracting one or more features from the pseudo-LiDAR data within the plurality of voxels, wherein each layer of the one or more layers comprises a plurality of pixels, each pixel comprises an individual feature extracted from an individual voxel, and a number of layers equals a number of features extracted from the pseudo-LiDAR data.

4. The method of claim 3, wherein the generating of the combined bird's eye view map comprises combining the one or more features from each first cell with the one or more features from each second cell that align with first cells.

5. The method of claim 1, wherein the features of the first bird's eye view map are combined with the features from the second bird's eye view map by an addition function.

6. The method of claim 1, wherein the features of the first bird's eye view map are combined with the features from the second bird's eye view map by a neural network.

7. The method of claim 1, wherein the features of the first bird's eye view map are combined with the features from the second bird's eye view map by concatenation.

8. A method of detecting an object, the method comprising:
   generating a bird's eye view of pseudo-LiDAR data by:
      receiving image data from one or more image sensors;
      generating a point cloud from the image data, wherein the point cloud comprises pseudo-LiDAR data;
      generating, from the point cloud, a first bird's eye view map having a first resolution;
      generating, from the point cloud, a second bird's eye view map having a second resolution; and
      generating a combined bird's eye view map by combining features of the first bird's eye view map with features from the second bird's eye view map; and
   detecting, using an object detection algorithm, one or more objects from the combined bird's eye view map.

9. The method of claim 8, further comprising generating, from the point cloud, one or more additional bird's eye view maps having one or more additional resolutions, wherein generating the combined bird's eye view map further comprises combining features of the one or more additional bird's eye view maps with the features of the first bird's eye view map and the second bird's eye view map.

10. The method of claim 8, wherein:
    generating the first bird's eye view map comprises:
       subdividing the pseudo-LiDAR data into a plurality of voxels having a first volume that is determined by the first resolution; and
       generating an array of first cells comprising one or more layers by extracting one or more features from the pseudo-LiDAR data within the plurality of voxels, wherein each layer of the one or more layers comprises a plurality of pixels, each pixel comprises an individual feature extracted from an individual voxel, and a number of layers equals a number of features extracted from the pseudo-LiDAR data;
    generating the second bird's eye view map comprises:
       subdividing the pseudo-LiDAR data into a plurality of voxels having a second volume that is determined by the first resolution; and
       generating an array of second cells comprising one or more layers by extracting one or more features from the pseudo-LiDAR data within the plurality of voxels, wherein each layer of the one or more layers comprises a plurality of pixels, each pixel comprises an individual feature extracted from an individual voxel, and a number of layers equals a number of features extracted from the pseudo-LiDAR data.

11. The method of claim 10, wherein the generating of the combined bird's eye view map comprises combining the one or more features from each first cell with the one or more features from each second cell that align with first cells in a vertical direction.

12. The method of claim 8, wherein the features of the first bird's eye view map are combined with the features from the second bird's eye view map by an addition function.

13. The method of claim 8, wherein the features of the first bird's eye view map are combined with the features from the second bird's eye view map by a neural network.

14. The method of claim 8, wherein the features of the first bird's eye view map are combined with the features from the second bird's eye view map by concatenation.

15. The method of claim 8, wherein the object detection algorithm comprises an object detection neural network.

16. A vehicle comprising:
    one or more image sensors that produce image data;
    one or more processors;
    one or memory modules comprising a non-transitory computer readable memory storing computer readable instructions that, when executed by the one or more processors, cause the one or more processors to:
       receive the image data from the one or more image sensors;

generate a point cloud from the image data, wherein the point cloud comprises pseudo-LiDAR data;

generate, from the point cloud, a first bird's eye view map having a first resolution;

generate, from the point cloud, a second bird's eye view map having a second resolution;

generate a combined bird's eye view map by combining features of the first bird's eye view map with features from the second bird's eye view map; and detect, using an object detection algorithm, one or more objects from the combined bird's eye view map.

17. The vehicle of claim 16, wherein the computer readable instructions further cause the one or more processors to control a movement of the vehicle based at least in part on the detected one or more objects.

18. The vehicle of claim 16, wherein the features of the first bird's eye view map are combined with the features from the second bird's eye view map by an addition function.

19. The vehicle of claim 16, wherein the features of the first bird's eye view map are combined with the features from the second bird's eye view map by a neural network.

20. The vehicle of claim 16, wherein the features of the first bird's eye view map are combined with the features from the second bird's eye view map by concatenation.

\* \* \* \* \*

UNITED STATES PATENT AND TRADEMARK OFFICE
CERTIFICATE OF CORRECTION

PATENT NO. : 11,501,490 B2
APPLICATION NO. : 16/940701
DATED : November 15, 2022
INVENTOR(S) : Victor Vaquero Gomez et al.

It is certified that error appears in the above-identified patent and that said Letters Patent is hereby corrected as shown below:

In the Claims

In Column 10, Line(s) 62, Claim 16, after "one or", insert --more--.

Signed and Sealed this
Fourteenth Day of February, 2023

*Katherine Kelly Vidal*

Katherine Kelly Vidal
*Director of the United States Patent and Trademark Office*